US010419489B2

(12) United States Patent
Kalia et al.

(10) Patent No.: US 10,419,489 B2
(45) Date of Patent: Sep. 17, 2019

(54) UNIDIRECTIONAL TRUST BASED DECISION MAKING FOR INFORMATION TECHNOLOGY CONVERSATION AGENTS

(71) Applicant: International Business Machines Corporation, Armonk, NY (US)

(72) Inventors: Anup K. Kalia, Yorktown Heights, NY (US); Maja Vukovic, New York, NY (US); Frederick Y. Wu, Greenwich, CT (US); Jin Xiao, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 15/587,370

(22) Filed: May 4, 2017

(65) Prior Publication Data
US 2018/0324215 A1 Nov. 8, 2018

(51) Int. Cl.
| G06F 21/00 | (2013.01) |
| H04L 29/06 | (2006.01) |
| G06Q 30/00 | (2012.01) |
| G06F 17/27 | (2006.01) |

(52) U.S. Cl.
CPC .......... *H04L 63/20* (2013.01); *G06F 17/271* (2013.01); *G06F 17/2785* (2013.01); *G06Q 30/016* (2013.01); *H04L 63/1433* (2013.01)

(58) Field of Classification Search
None
See application file for complete search history.

(56) References Cited

U.S. PATENT DOCUMENTS

| 6,378,075 B1 | 4/2002 | Goldstein et al. |
| 7,213,047 B2 | 5/2007 | Yeager et al. |
| 8,225,392 B2* | 7/2012 | Dubrovsky ......... H04L 63/1433 726/22 |
| 9,251,342 B2* | 2/2016 | Becker .................. G06F 21/556 |

(Continued)

FOREIGN PATENT DOCUMENTS

| CN | 103746957 B | 1/2017 |
| WO | 2015193839 A1 | 12/2016 |

OTHER PUBLICATIONS

Johnson, M. Eric et al. Security through Information Risk Management. IEEE Security&Privacy, vol. 7, Issue: 3. https://ieeexplore.ieee.org/stamp/stamp.jsp?tp=&arnumber=5054909 (Year: 2009).*

(Continued)

*Primary Examiner* — Jeremiah L Avery
(74) *Attorney, Agent, or Firm* — Intelletek Law Group, PLLC; Gabriel Daniel, Esq.

(57) ABSTRACT

A method and system of processing an information technology (IT) electronic request is provided. The electronic request is received in natural language from a user. Parameters of the electronic request are extracted. A risk of the electronic request is determined. A policy based on the parameters and the risk of the electronic request is determined and executed. A level of trust between the user and the computer device is calculated based on the determined risk and an outcome of the execution of the policy. A conversation pattern of the computer device toward the user is adjusted based on the calculated level of trust.

20 Claims, 8 Drawing Sheets

(56) References Cited

U.S. PATENT DOCUMENTS

| | | | |
|---|---|---|---|
| 2003/0212546 A1* | 11/2003 | Shaw | G06F 17/279 704/9 |
| 2004/0153512 A1 | 8/2004 | Friend | |
| 2007/0162761 A1* | 7/2007 | Davis | G06Q 10/00 713/182 |
| 2008/0287821 A1* | 11/2008 | Jung | G06F 19/3418 600/544 |
| 2009/0089126 A1* | 4/2009 | Odubiyi | G06F 17/271 705/7.39 |
| 2009/0144827 A1* | 6/2009 | Peinado | G06F 21/577 726/25 |
| 2009/0254971 A1* | 10/2009 | Herz | G06Q 10/10 726/1 |
| 2010/0174813 A1* | 7/2010 | Hildreth | G06Q 10/107 709/224 |
| 2011/0209196 A1* | 8/2011 | Kennedy | G06F 21/55 726/1 |
| 2012/0131055 A1* | 5/2012 | Schindler | G06F 17/2785 707/776 |
| 2014/0365222 A1 | 12/2014 | Weider et al. | |
| 2014/0380425 A1* | 12/2014 | Lockett | H04L 63/20 726/4 |
| 2016/0210446 A1 | 7/2016 | Hamlin et al. | |
| 2017/0111383 A1* | 4/2017 | Most | H04L 63/08 |
| 2018/0005235 A1* | 1/2018 | Thorne | G06Q 20/409 |

OTHER PUBLICATIONS

Ho, Shuyuan Mary et al. Real or Spiel? A Decision Tree Approach for Automated Detection of Deceptive Language-Action Cues. 2016 49th Hawaii International Conference on System Sciences (HICSS). https://ieeexplore.ieee.org/stamp/stamp.jsp?tp=& arnumber= 7427646 (Year: 2016).*

Johnson, Nick et al. The importance of trust between operator and AUV: Crossing the human/computer language barrier. Oceans 2007—Europe. https://ieeexplore.ieee.org/stamp/stamp.jsp?tp=&arnumber= 4302408 (Year: 2007).*

Mayer et al., "An Integrative Model of Organizational Trust," Academy of Management Review, vol. 20, No. 3 (1995), pp. 709-734.

* cited by examiner

UNIDIRECTIONAL TRUST BASED DECISION MAKING FOR INFORMATION TECHNOLOGY CONVERSATION AGENTS

BACKGROUND

Technical Field

The present disclosure generally relates to natural language interfaces, and more particularly, to natural language interfaces that are used to process Information Technology electronic requests.

Description of the Related Art

In recent years, there has been an increase in the use of natural language processing (NLP), which is a field of artificial intelligence, computer science, and computational linguistics that deals with the interaction between a human (i.e., the natural element) and computers. Many different types of machine learning algorithms have been applied to NLP tasks to better accommodate the human interacting with the machine. These algorithms take as input a large set of "features" that are generated from the input data. In some scenarios, to process a request that is provided in natural language, there is iterative communication between the human and the machine.

SUMMARY

According to various embodiments, a computing device, a non-transitory computer readable storage medium, and a method are provided to process an information technology (IT) request. The IT request is received in natural language from a user. Parameters of the request are extracted. A risk of the request is determined. A policy based on the parameters and the risk of the request is determined and executed. A level of trust between the user and the computer device is calculated based on the determined risk and an outcome of the execution of the policy. A conversation pattern of the computer device toward the user is adjusted based on the calculated level of trust.

In one embodiment, extracting parameters of the request includes performing speech recognition to determine a textual representation of the request; performing speech segmentation on the textual representation of the request; and applying concept expansion on the textual representation of the request to determine an intent of the IT request.

In various embodiments, calculating the level of trust between the user and the conversation agent includes at least one of (i) calculating a level of trust of the conversation agent toward the user and (ii) calculating a level of trust of the user toward the conversation agent.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to natural language interfaces that are used to process Information Technology (IT) requests that are provided in natural language. When two parties, such as an individual and an organization, work together, it often involves interdependence. A party therefore depends on others in various ways to accomplish their goals. Accordingly, a working relationship is established between the two parties.

To minimize the risk inherent in working relationships, the trust between the two parties is a salient element. In at least one definition, the term "trust" refers to the willingness of a party to be vulnerable to the actions of another party based on the expectation that the other will perform an action requested by the first party (i.e., requestor), irrespective of the ability to monitor or control that other party. The more trust there is between the two parties, the more efficient the interaction is between them.

Accordingly, a clear understanding of trust and its parameters can facilitate cohesion and collaboration between the two parties. By building trust between a requestor (i.e., human) and a machine (i.e., a computing device) requests can be executed efficiently and with reduced risk. To that end, methods and systems are provided herein that process an IT request that is provided in natural language. Parameters of the request are extracted from the natural language request. A risk of fulfilling the request is determined. A policy is identified based on the request and the risk associated therewith. The policy is executed accordingly. A trust is calculated between the user and the conversation agent based on the determined risk and an outcome of the execution of the policy. The behavioral approach, in terms of the conversation pattern and/or action flow, of the conversation agent toward the user is adjusted based on the level of trust. Reference now is made in detail to the examples illustrated in the accompanying drawings and discussed below.

Example Architecture

Figure 1:
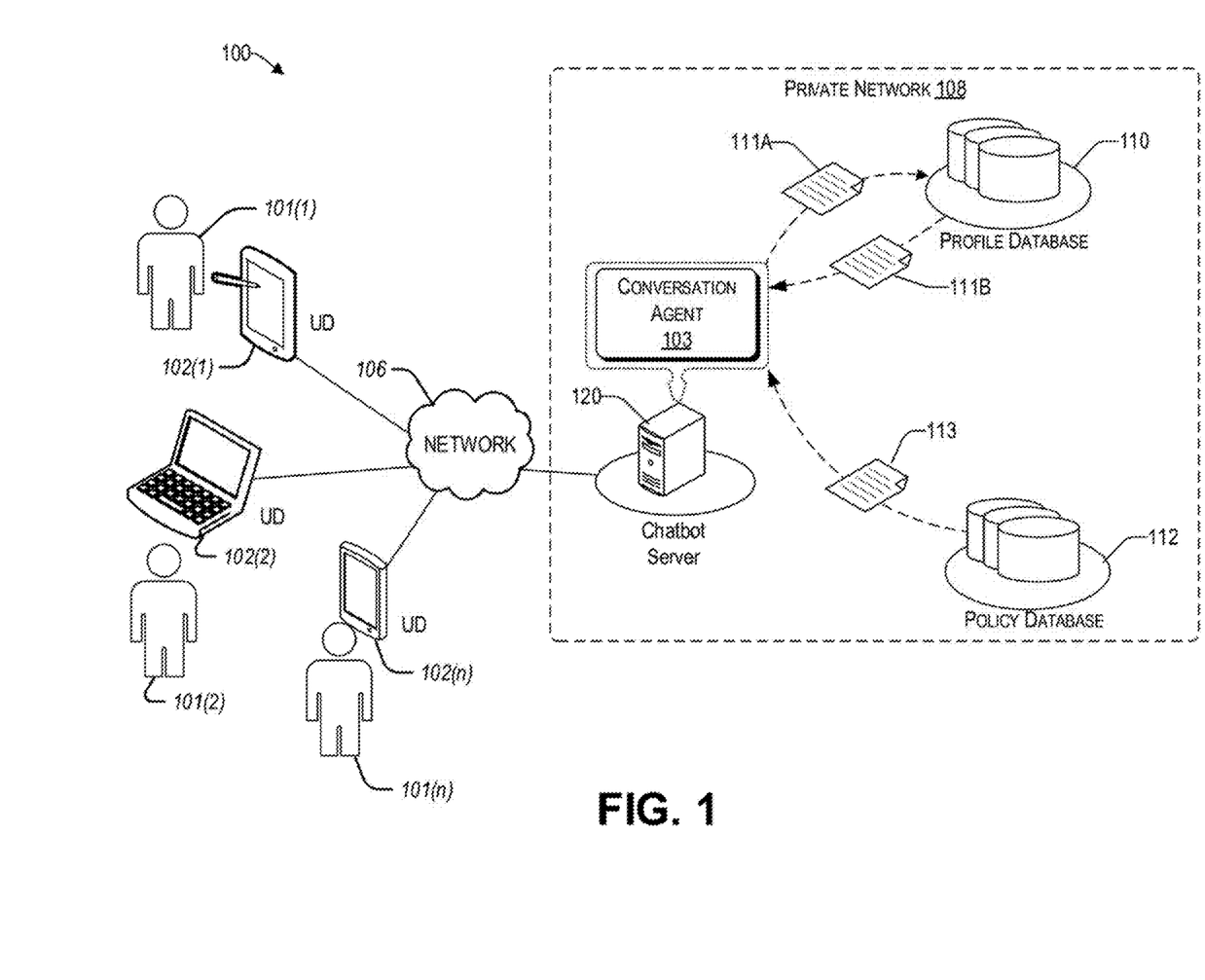
FIG. 1 illustrates an example architecture for implementing a system for processing an IT request in that is received in natural language.

FIG. 1 illustrates an example architecture 100 for implementing a system for processing an IT request that is received in natural language. Architecture 100 includes a network 106 that allows various user devices 102(1) to 102(n) to communicate with each other, as well as any other components that are connected to the network 106, such as a chatbot server 120, a profile database 110, and a policy database 112.

The network 106 may be, without limitation, a local area network ("LAN"), a virtual private network ("VPN"), a cellular network, the Internet, or a combination thereof. For example, the network 106 may include a mobile network that is communicatively coupled to a private network that provides various ancillary services, such as communication with various application stores, libraries, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The network 106 allows a conversation agent 103 running on the chatbot server 120 to communicate with one or more users 101(1) to 101(n), sometimes referred to herein as the requestor party, over their user devices (UD's) 102(1) to 102(n), respectively, to request a resource from the private network 108 of a business enterprise, such as an IT request. IT requests may include, without limitation, resetting a password, additional functionality, curing a network problem, increasing bandwidth, additional memory, and the like.

For purposes of later discussion, several user devices appear in the drawing, to represent some examples of the devices that may be used to initiate an IT request via the network 106. Today, user devices typically take the form of portable handsets, smart-phones, tablet computers, personal digital assistants (PDAs), virtual reality (VR) devices, augmented reality (AR) devices, and smart watches, although they may be implemented in other form factors, including consumer, and business electronic devices. A user device (e.g., 102(1)) may be used to interact with the private network 108 over the network 106, to receive one or more resources provided by the private network 108, including fulfilment of IT requests.

In one embodiment, the private network 108 includes a conversation agent 103 that runs on a chatbot server 120, a profile database 110, and a policy database 112. The conversation agent 103 is operative to receive requests from users via their respective user devices, in natural language. In one aspect, the conversation agent 103 is a chatbot that takes user requests as its input, and infers meaning of the request by performing a syntactic and a semantic analysis thereof. The conversation agent 103 is a computer program that can conduct a conversation via auditory, textual, and/or haptic methods by sending digital messages to user devices that are decoded and provided on a user interface of the user device (e.g., 102(1)).

In some embodiments, the conversation agent 103 can convincingly simulate a perception by a user (e.g., 101(1)) that the conversation is being conducted with a human partner. Accordingly, a user device (e.g., 102(1)), the network 106, and the conversation agent 103 create a dialog system for various practical purposes, including receiving and processing IT customer service requests.

In one embodiment, the conversation agent 103 uses NLP to process the raw natural language content of the request received from the user device (e.g., 102(1)). This natural language content may be provided as a text (e.g., short message system (SMS), e-mail, etc.,) or via voice. Regarding the latter, the conversation agent 103 can perform speech recognition to determine the textual representation thereof. In natural speech, there may not be discernable pauses between successive words. To that end, speech segmentation may be performed to separate the words into meaningful sentences.

In one embodiment, concept expansion, such as the IBM Watson concept expansion, can be used to identify the concept cues in the request to determine the intent thereof. In this regard, large sets of unstructured sets of data may be provided to the conversation agent 103, such that it can learn therefrom. The large sets of unstructured data may relate to prior IT request that were successfully handled by the private network 108, which now acts as a corpus of data to learn from. Such concept expansion enables the creation of a specialized dictionary for the cognitive application of identifying the subject matter and scope of the IT request, collectively referred to herein as the "intent" of the request. Concept expansion enables the conversation agent 103 to build a specialized dictionary for the cognitive application of interacting with a user having an IT request. Thus, unstructured source text that may not include well-formed language, such as email, text messages, and text that has been extracted via speech recognition. Accordingly, the conversation agent 103 can correctly understand industry specific terminology, local euphemisms, and colloquial terms that traditional chatbots may be challenged with.

For example, if the user 101(1) provides a request via their user device 102(1) to "add 2 GB of memory to the server abc001," the conversation agent 103 can identify the key terms (e.g., "add," "memory," and "server") and infers that the request relates to a hardware upgrade (meaning). Based on the inferred meaning of the IT request, the conversation agent 103 can execute appropriate action based on the appropriate business rules, sometimes referred to herein as policies, as is discussed in more detail later.

The private network 108 of the business enterprise, includes a profile database 110 that may include subscriptions, payment status information, password information, location, etc. In one embodiment, the profile database 110 may also store level of trust information between a user and the conversation agent 103. For example, upon determining a level of trust of a user toward the conversation agent 103, this trust level information 111A can be stored in the account of the user in the profile database 110. Further, upon interacting with a user, the latest trust level information 111B may be retrieved from the profile database 110 such that the conversation pattern with the user is adjusted dynamically. Accordingly, the machine conversation with the user is based on at least one of: (i) the trust of the user toward the conversation agent 103, and (ii) the trust of the conversation agent 103 toward a user.

For example, based on the evaluated trust of a user toward the conversation agent 103, behavioral modifications are made to the conversation agent (e.g., in conversation pattern and/or action flows), thereby enhancing the effectiveness and usability of the conversation agent 103 of the chatbot server 120.

Further, based on the trust of the conversation agent 103 toward the user, the conversation agent 103 can make appropriate behavioral modifications, such as adaptively adding or removing security measures and/or controls during the process of approving and executing an IT request. In some embodiments, security alarms may be raised and sent to one or more appropriate recipients. An appropriate recipient may be the account holder (i.e., user) with respect to the IT request, an IT administrator of the private network 108, a security agent of the private network 108, etc. The alert notification may be sent in various ways, such as common short code (CSC) using a short message service (SMS), multimedia message service (MMS), e-mail, telephone, social media, etc.

In one embodiment, the private network 108 of the business enterprise includes a policy database 112 from which the conversation agent 103 can retrieve a policy 113 based on the identified IT request of the user. For example, upon extracting the parameters and determining the intent of the IT request, the appropriate policy 113 is determined for the request. The request can then be processed by the conversation agent 103 accordingly.

By virtue of the architecture 100 discussed herein, the conversation agent 103 of the chatbot server 120 can automatically accommodate IT requests from users in a way that not only improves customer (i.e., user) satisfaction by increasing the trust perceived by the user with respect to the conversation agent 103, but also increases security and efficiency by adjusting the type of conversation based on the trust perceived by conversation agent 103 with respect to the user.

While the chatbot server 120, profile database 110, and policy database 112 are illustrated by way of example to be on different platforms, it will be understood that in various embodiments, the chatbot server 103, profile database 110, and policy database 112 may be combined in various combinations. In other embodiments, these computing platforms may be implemented by virtual computing devices in the form of virtual machines or software containers that are hosted in a cloud, thereby providing an elastic architecture for processing and storage.

Example User Device

Figure 2:
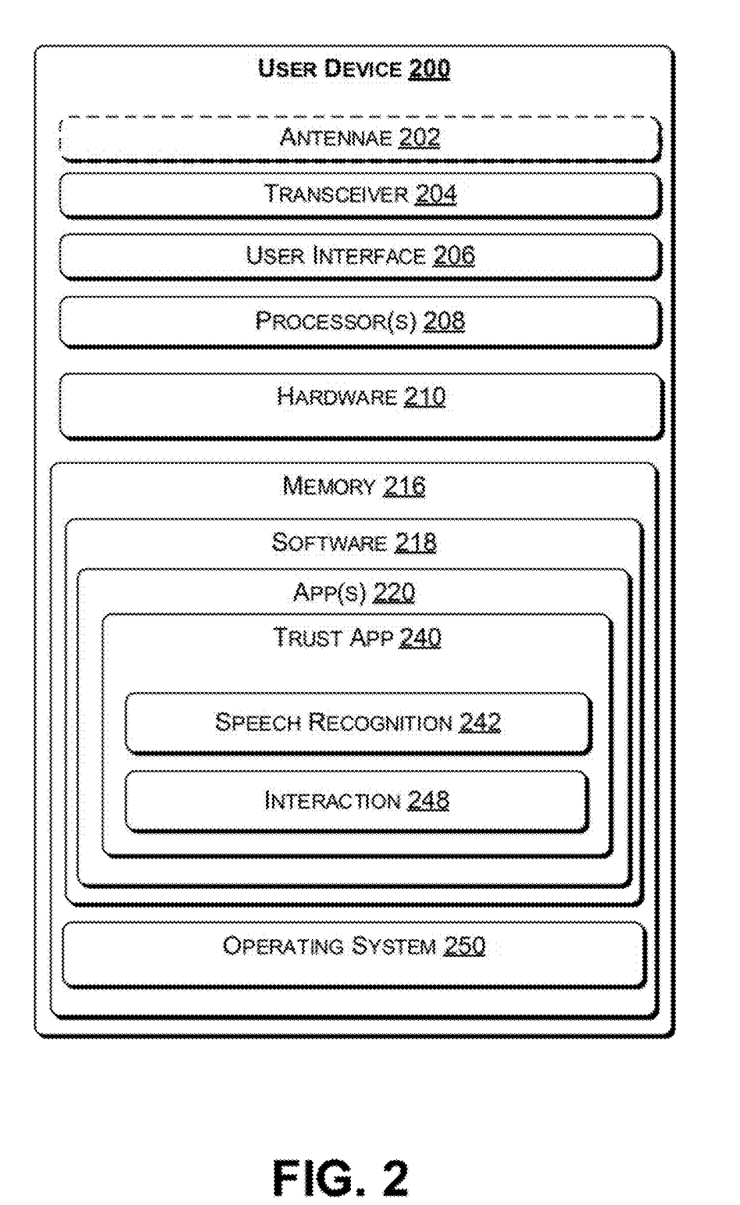
FIG. 2 illustrates a block diagram showing various components of an illustrative user device at a high level.

As discussed in the context of FIG. 1, the natural language processing system in the architecture 100 may involve different types of user devices. To that end, FIG. 2 illustrates a block diagram showing various components of an illustrative user device 200 at a high level. For discussion purposes, the illustration shows the user device 200 in the form of a wireless computing device.

The user device 200 may include one or more antennae 202; a transceiver 204 for cellular, Wi-Fi communication, and/or wired communication; a user interface 206; one or more processors 208; hardware 210; and memory 216. In some embodiments, the antennae 202 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 204, sometimes collectively referred to as a network interface, which is configured to receive and transmit digital data. In one embodiment, the user device 200 does not include an antenna 202 and communication with external components is via wired communication.

In one embodiment, the user device 200 includes a user interface 206 that enables a user to provide input and receive output from the user device 200. For example, the user interface 206 may include a data output device (e.g., visual display, audio speakers, haptic device, etc.,) that may be used to provide notifications from the conversation agent 103 of the chatbot server 120.

The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces. For example, the data input devices may be used to receive natural language request from a user and/or satisfaction feedback solicited by the conversation agent during a communication session between the user device 200 and the conversation agent.

The user device 200 may include one or more processors 208, which may be a single-core processor, a multi-core processor, a complex instruction set computing (CISC) processor, or another type of processor.

The hardware 210 may include a power source and digital signal processors (DSPs), which may include single-core or multiple-core processors. The hardware 210 may also include network processors that manage high-speed communication interfaces, including communication interfaces that interact with peripheral components. The network processors and the peripheral components may be linked by switching fabric. The hardware 210 may further include hardware decoders and encoders, a network interface controller, and/or a USB controller.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components or modules that are executable or accessible by the processor(s) 208 and controller(s) of the user device 200. The various components of the memory 216 may include software 218 and an operating system 250. The software 218 may include various applications 220. The software 218 may also include a trust application 240 having several modules. Each module may include routines, program instructions, objects, and/or data structures that perform tasks or implement abstract data types.

For example, the trust application 240 of the user device 200 may include a speech recognition module 242 that enables the recognition (and possible translation) of spoken language into text, such that it can be further processed by the conversation agent 103.

While a trust application 240 has been illustrated to be part of the user device 200, in some embodiments, the functions performed by the trust application, such as speech recognition is, is performed directly by the conversation agent 103, as will be discussed in more detail later. Accordingly, a user device 200 may be used to interact with the conversation agent without a trust application 240 stored therein.

The operating system 250 may include components that enable the user device 200 to receive and transmit data via various interfaces (e.g., user controls, communication interface, and/or memory input/output devices), as well as process data using the processor(s) 208 to generate output. The operating system 250 may include a presentation component that presents the output (e.g., display the data on an electronic display of the user device 200, store the data in memory 216, transmit the data to another electronic device, etc.). Additionally, the operating system 250 may include other components that perform various additional functions generally associated with an operating system 250.

Example Call Flows

Figure 3A:
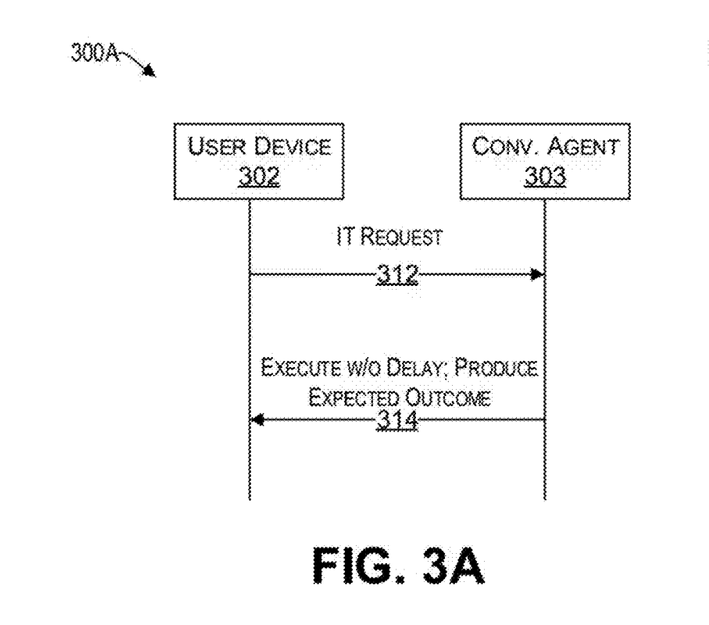
FIGS. 3A and 3B are example call flows that describe the determination of trust of a user toward a conversation agent.
Figure 3B:
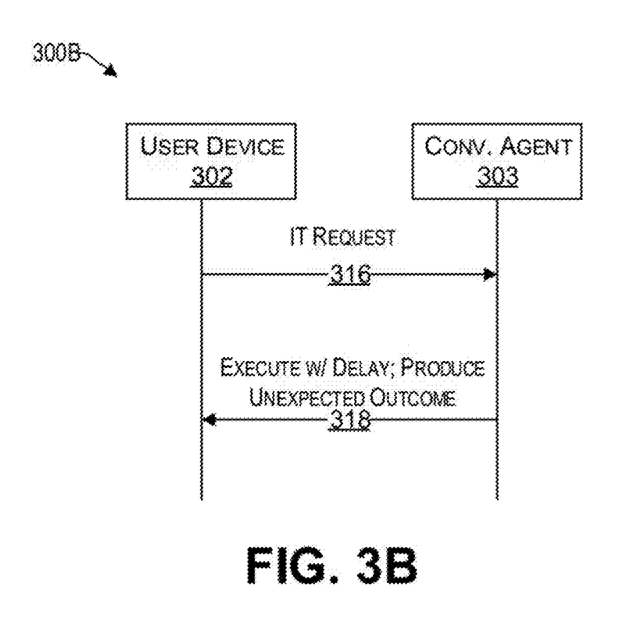

Reference now is made to FIGS. 3A and 3B, which are example call flows 300 that describe the determination of trust of a user 302 toward a conversation agent 303. In particular, FIG. 3A illustrates a scenario where trust is built, while FIG. 3B illustrates a scenario where trust is degraded between a user 302 and a conversation agent 303.

For example, a user may send an IT request 312 to a business enterprise in natural language, via their user device 302. The conversation agent 303 receives the IT request 312 and processes it successfully based on policies and without delay (at step 314). Since the interaction between the user device 302 and the conversation agent 303 progressed without any difficulties, the conversation agent 303 can conclude that there is an increase of trust of the user 302 toward the conversation agent 303. Consequently, a subscriber (sometimes referred to herein simply as "user") of the services provided by the business enterprise, will more likely use the conversation agent 303 for future IT requests.

However, a request may not always be able to be executed smoothly (e.g., without iteration or difficulty). For example, the conversation agent 303 may request various indicia of verification from the user, which may be difficult for the user to provide (e.g., they forgot passwords, their requests are not clear, etc.). Further, the conversation agent 303 may initially misinterpret the request, which may lead to a delay and/or an unexpected outcome 318 (from the perspective of the user). If the call lasts longer than a predetermined time period, or when the request cannot be fulfilled based on policy, then the level of trust between the user and the conversation agent 303 is deemed to degrade.

Figure 4A:
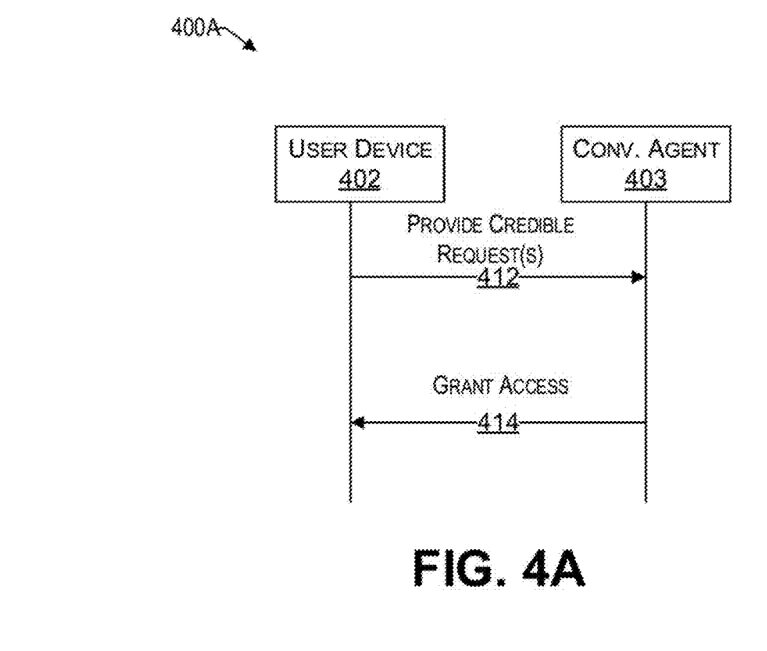
FIGS. 4A and 4B illustrate example call flows and that describe the determination of trust of a conversation agent toward a user.
Figure 4B:
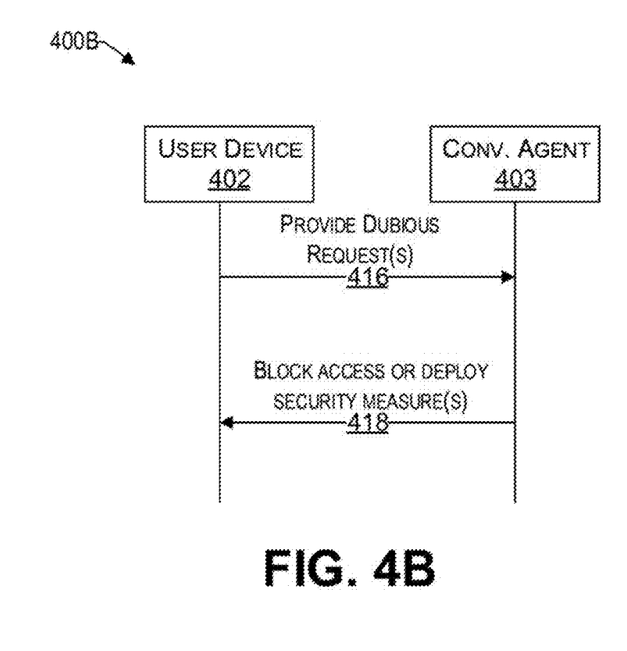

Similar concepts apply to determining the trust of the conversation agent toward the user. In this regard, FIGS. 4A and 4B illustrate example call flows 400A and 400B that describe the determination of trust of a conversation agent 403 toward a user 402. In particular, FIG. 4A illustrates a scenario where trust is built, while FIG. 3B illustrates a scenario where trust of a conversation agent 403 toward the user is degraded.

For example, a user may send an IT request 412 to a business enterprise in natural language, via their user device 402. The conversation agent 403 receives the IT request 412 and deems it to be credible based on an accessed risk and policy associated therewith. Consequently, the conversation agent 403 grants access (414) or makes the resource available as requested by the user device. Since the interaction between the user device 402 and the conversation agent 403 progressed without any difficulties, the conversation agent 403 can deem the requestor user can be trusted, thereby increasing a level of trust perceived by the conversation agent 403 toward the user, represented by the user device 402. The more accurate and expedient the responses from the user via their user device 402 are, the more the level of trust increases. Consequently, subsequent communication between the user device 402 and the conversation agent 403 may have fewer impediments (e.g., lower threshold of authentication) allowing a more lenient conversation pattern between the parties. For example, fewer and/or more simple questions and/or procedures may be followed by the conversation agent 403, thereby improving the efficiency of the chatbot server running the conversation agent 403.

However, as illustrated in FIG. 4B, the user device may provide an IT request 416 that is deemed to be dubious by the conversation agent 403. For example, the conversation agent 403 may identify the risk of performing the request may be above a predetermined threshold. Alternatively, or in addition, the user may not have authorization for the request, or may have requested something that is an error (e.g., cannot upgrade a laptop to 16G RAM because of hardware limitations). In this regard, the execution of the request may be blocked and/or security measures may be taken. Thus, when a trigger even occurs, such as the request not being successfully fulfilled, a response from a user not being received within a threshold time period, the identified risk associated with the request is above a threshold level, etc., then the trust of the conversation agent 403 toward the user degrades. Consequently, subsequent communication between the conversation agent 403 and the user device may be more cautious (e.g., involve more checks, more detailed requests, etc.). Put differently, the behavior of the conversation agent 403 toward the user device changes to a more cautious one.

Example Models to Predict Trust

Figure 5A:
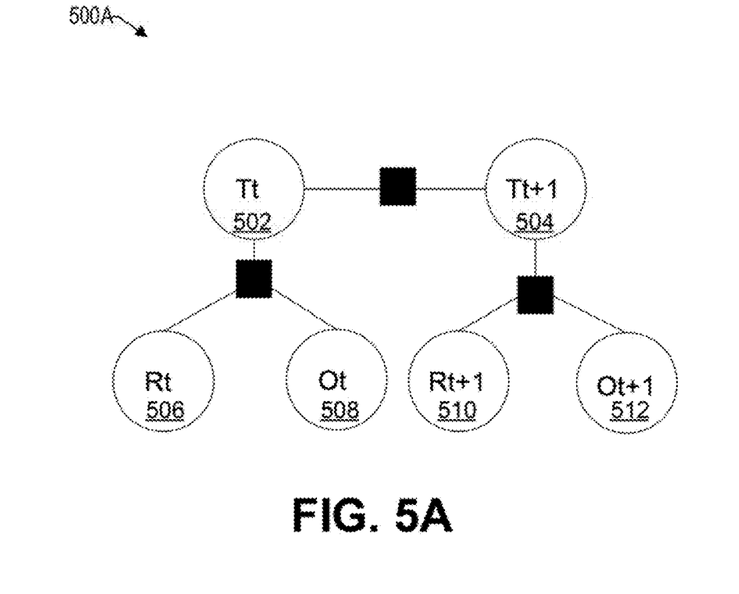
FIGS. 5A and 5B are example graphical models to determine trust between parties.
Figure 5B:
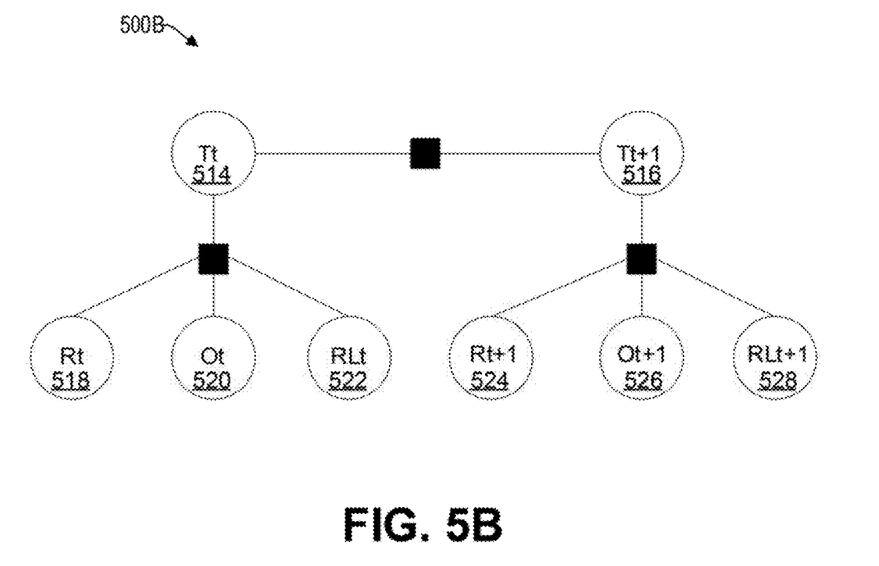

Reference now is made to FIGS. 5A and 5B, which are example graphical models, sometimes referred to as probabilistic graphical models (PGM), to determine levels of trust between parties. In particular, FIG. 5A is a graphical model that determines a level of trust of a user toward a conversation agent, and FIG. 5B is a graphical model that determines a level of trust of a conversation agent toward a user.

For example, the conditional random field 500A of FIG. 5A can be viewed as an undirected graphical model. It represents input and output variables (e.g., X, Y) as feature functions (e.g., undirected edges). Each line indicates a dependency. The input variable x represents a sequence of observations, provided by equation 1 below:

$$x = \{R, O, RL\}_{t-1}^{T} \quad \text{(Eq. 1)}$$

Where:
R represents risk,
O represents outcome of the execution of the policy,
RL represents relevance (when available), and
t represents the time length of a sequence (e.g., 1, 2, ..., t, t+1, T).

The output variable Y represents the sequence of states, provided by equation 2 below:

$$y = \{T\}_{t=1}^{T} \quad \text{(Eq. 2)}$$

Where T represents trust.

In one embodiment, to calculate y given x, the conditional probability of y given input sequence x (i.e., P(Y|X)) is provided in equation 3 below:

$$p(y|x) = \frac{p(y,x)}{\sum_y p(y,x)} = \frac{\exp\left\{\sum_{k=1}^{K} \lambda_k f_k(y_t, y_{t-1}, x_t)\right\}}{\sum_y \exp\left\{\sum_{k=1}^{K} \lambda_k f_k(y_t, y_{t-1}, x_t)\right\}} \quad \text{(Eq. 3)}$$

Where:
$f_k(y_t, y_{t-1}, x_t)$ represents a feature function,
K represents the number of feature function and $\lambda_k$ represents the weight of the feature function k, and each feature function covers state-state pair $(y_t, y_{t+1})$ and state-observation pair $(y_t, x_t)$.

In the example of FIG. 5A, which determines the trust of a user toward a conversation agent, the output variables are provided by equation 4 below:

$$y=\{T_t, T_{t+1}\} \quad (Eq. 4)$$

Where:
T represents trust,
t represents a first time, and
t+1 represents a second time.

In the example of FIG. 5A, the input variables are provided by equation 5 below:

$$x=\{R_t, O_t, R_{t+1}, O_{t+1}\} \quad (Eq. 5)$$

Where:
R represents risk,
O represents outcome,
t represents a first time, and
t+1 represents a second (i.e., later) time.

The edges represent the feature functions f(T, $T_{t+1}$, x). The determination of trust $T_{t+1}$ depends on $T_t$ and x={$R_{t+1}$, $O_{t+1}$}. Thus, the trust for a first time $T_t$ 502 is based on the risk at time t Rt 506 and the outcome at time t Ot 508 (e.g., whether the request was successfully fulfilled). The trust at a second time $T_{t+1}$ 504 is based on the risk Rt+1 510 and the outcome Ot+1 512 and the prior trust at Tt 502.

In the example of FIG. 5B, which determines the trust of a conversation agent toward a user, the output variables are also governed by equation 4 above, which is not repeated here for brevity. The input variables are provided by equation 6 below:

$$x=\{R_t, O_t, RL_{t+1}, R_{t+1}, O_{t+1}, RL_{t+1}\} \quad (Eq. 6)$$

Where:
R represents risk,
RL represents relevance of the request with respect to the resources of the private network 108,
O represents outcome,
t represents a first time, and
t+1 represents a second time.

The edges represent the feature functions f(T, $T_{t+1}$, x). In this regard, it is noted that a feature function captures dependencies between variables $T_t$, $T_{t+1}$, and x. These feature functions are essentially of two type. The first is called a transition feature function that captures dependencies between T, $T_{t+1}$, and x. The second is called a state feature function that captures the dependencies between $T_{t+1}$, and x. The determination of trust $T_{t+1}$ depends on $T_t$ and x={$R_{t+1}$, $O_{t+1}$, $RL_{t+1}$}. Thus, the trust for a first time $T_t$ 514 is based on the risk at time t Rt 518, the outcome at time t Ot 520 (e.g., whether the request was successfully executed), and the relevance of the request with the outcome at time t RLt 522. The trust at a second time $T_{t+1}$ 516 is based on the risk Rt+1 510 and the outcome Ot+1 512 and the prior trust at Tt 514.

Example State Transition Tables

Figure 6A:
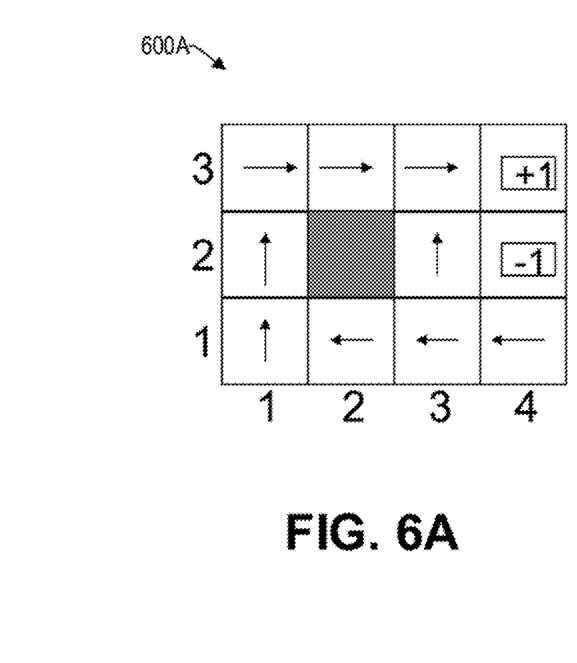
FIGS. 6A and 6B are state transition tables, consistent with exemplary embodiments.
Figure 6B:
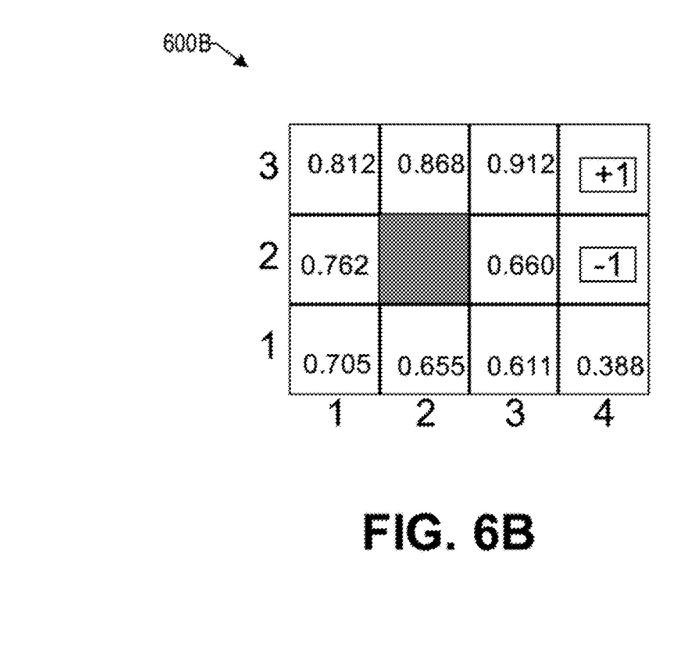

Reference now is made to FIGS. 6A and 6B, which are state transition tables, consistent with exemplary embodiments. The goal is to increase a level of trust of the user toward the conversation agent (and/or from the conversation agent toward the user). It should be noted that many aspects of the level of trust (i) from a user toward a conversation agent and (ii) a conversation agent toward the user, are similar. Accordingly, aspects of the state transition tables 600A and 600B are discussed below with respect to the level of trust from the conversation agent toward the user, and not repeated for the other direction, for brevity.

For example, there may be an on-going conversation between a user and a conversation agent with respect to fulfilling an IT request. After each iteration, the level of trust between the user and the conversation agent may be different. If the level of trust is below a predetermined threshold, e.g., 0.7 on a scale of 0 to 1, then the conversation agent may attempt to increase the level of trust by taking different paths on the state transition table 600A.

The level of trust provides the user a basis for making appropriate decision. In one embodiment, to learn which action a user is likely to take based on their identified present level of trust toward the conversation agent, a reinforcement learning approach is used to learn an optimal policy of states and actions. In the state transition table of FIG. 6A, each state represents a measurement of trust. The value of each cell represents its utility, which is calculated by the conversation agent based on the present state and the action. FIGS. 6A and 6B represent matrixes of state-action transition, where +1 and −1 represents two different rewards.

In FIG. 6A, the arrows represent different possible actions a user may take based on their present state (or level of trust). In FIG. 6B, the value in each state represents utilities achieved by the user based on the combination of state and the action performed by the conversation agent. For example, initially the utilities are assigned a value of 0. After a set of iterations, utilities are updated to reveal an optimal path that a user may take to receive a positive reward (+1).

As used herein, a present state is denoted as "i," and a next state when taking action "a" in state "i" is "j." In this regard, $M_{ij}^a$ is the probability to reaching state "j" when taking action "a" in state "i." For every state transition, the goal is to improve the level of trust, if possible. The highest reward attainable is +1 and the lowest reward (e.g., punishment) is −1. To that end, FIG. 6A illustrates a state transition table that indicates what next state to take, based on the present state.

For example, a user may submit an IT request to increase the bandwidth for their user device. To complete this request, there may be several communication iterations between the user and the conversation agent. The user may be asked for identifying information (e.g., password). Upon successfully providing the correct password within a predetermined time, the utility afforded to the user may be at quadrant (1,1) in FIG. 6B, having a level of utility of 0.705.

For example, consider a user desiring an IT action to be performed by the conversation agent. However, the user may not know what actions the user should take such that the conversation agent successfully executes the request. Consider also that the user is at quadrant (1,1) and does not know which path to follow (e.g., whether to move up (2,1) or go right (1,2)). In such a situation, a user may try out various strategies randomly. For example, the user may choose to go up or right. The user may continue their strategy until they reach a reward +1 (where their request is successfully fulfilled) or −1 (where their request is not granted) by the conversation agent. Based on the reward it receives the utilities of the path it followed is updated.

By way of another example, consider a user requesting the conversation agent to fulfill its IT requests by moving right. However, for various reasons, the conversation agent may not successfully resolve the request. At this time, the user is calculated by the conversation agent to "receive" a reward of −1. In the next iteration, the conversation agent may expect the user to escalate the request by moving up and finally getting a reward of +1, where, the request is fulfilled.

Example Reinforcement Learning

In one embodiment, when the conversation agent executes a request successfully, the user is deemed to have a reward of +1, a reward of −1 when the request is executed unsuccessfully, and a reward of 0 when the conversation agent does nothing (e.g., executes a policy, which does not fulfill the request). A positive reward increases a proportional level of trust of the user toward the conversation agent, while a negative reward decreases a proportional level of trust of the user toward the conversation agent. In various embodiments, whether an execution of a request is deemed to be successful for a user can be based on feedback provided by the user over their user device, or can be ascertained by the conversation agent. For example, upon completing a request, the conversation agent may request feedback from the user device, asking the user to rank the execution of the request on an appropriate scale. The score may be binary (e.g., thumbs up or down), alpha-numeric (e.g., 0 to 10, A to F), descriptive (e.g., none, low, medium, and high), based on color (e.g., red, green, and yellow), or any other suitable rating scale. Alternatively, or in addition, the conversation agent may ascertain the level of trust based on whether the request was fulfilled as requested, within a predetermined time, and a number if iterations with the user device.

Similarly, when the user provides requests that are deemed to be of low risk and/or responds to inquiries successfully and within a predetermined time, a reward of up to +1 may be provided to the user. The level of trust goes down when the user does not provide a request that is of low risk and/or responds to an inquiry successfully within the predetermined time. The utility computation is provided by equations below:

$$U_h([S_0, S_1 \ldots S_n]) = R_0 + U_h([S_1, \ldots S_n]) \quad \text{(Eq. 7)}$$

Where:
  $U_h$ represents the utility of a state h,
  S represents the state, and
  R represents the reward.

The policy represents a path taken by a user. It maps a state space to actions. It is represented as a sequence of states and actions. A policy can be written as (s1, a1)→(s2, a2)→(s3, a3), where s1, s2, and s3 are states, and a1, a2, and a3 are actions. A policy is provided by equation 8 below:

$$\text{Policy}^*(i) = \arg\max_a \sum_j M_{ij}^a U(j) \quad \text{(Eq. 8)}$$

Where:
  i represents the present state,
  a represents an action performed by the conversation agent,
  j represents the neighboring state
  U represents the utility or value of a state, and
  M represents the transition probability of moving from state I to state j.

Equation 9 below provides the utility calculation for the present state . . .

$$U(i) = R(i) + \max_a \sum_j M_{ij}^a U(j) \quad \text{(Eq. 9)}$$

Where:
  i represents the present state,
  a represents an action performed by the conversation agent
  j represents the neighboring state
  U represents the utility or value of a state, and
  M represents the transition probability of moving from state I to state j.

Example Process

Figure 7:
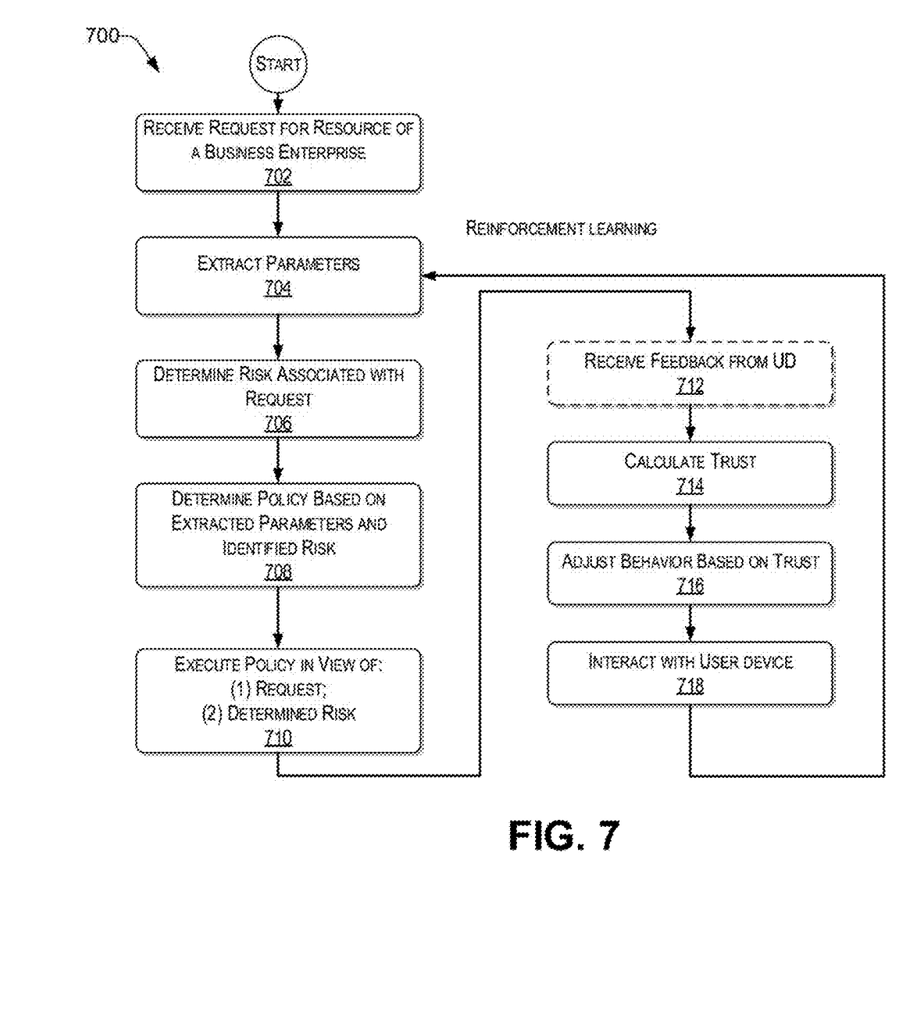
FIG. 7 presents an illustrative process of determining a level of trust between a user and a conversation agent running on a chatbot server.

With the foregoing overview of the architecture 100, example user device 200, call flows 3A, 3B, 4A, and 4B, example graphical models 5A and 5B, and example state transition tables 6A and 6B, it may be helpful now to consider a high-level discussion of an example process. To that end, FIG. 7 presents an illustrative process 700 of determining a level of trust between a user and a conversation agent 103 running on a chatbot server 120. Process 700 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 700 is described with reference to the architecture 100 of FIG. 1.

At block 702, the conversation agent 103 (running on the chatbot server 120) receives an IT request in natural language from a user device 102(1), over a network 106. The user 101(1) of the user device 102(1) may be subscribed to a service or be part of a business enterprise that has its computer infrastructure managed by a private network 108. For example, the request may be to add additional memory to a computer.

At block 704, the conversation agent 103 extracts parameters of the received request. In one embodiment, extracting parameters of the received request include applying concept expansion to determine the intent of the request from the natural language.

At block 706, a risk of the request is determined. As used herein, the term "risk" refers to how fulfillment of the received request would affect one or more IT resources of the private network 108 of a business enterprise and/or the user themselves. For example, would fulfillment increase the vulnerability of the private network 108? Is there a high likelihood that the user would default? Is the present request in line with an equally situated user (e.g., having a similar account, in a similar location, etc.)? Would resetting the password make the user more vulnerable? In one embodiment, the conversation agent 103 sends identification information of the user 101(1) (e.g., received from the user device 102(1)), to a profile database 110 to receive profile information of the user. The profile information may be used to determine whether the present request is consistent with the profile of the user.

At block 708, the conversation agent 103 determines a policy based on the extracted parameters of the IT request. In one embodiment, the conversation agent 103 receives the policy 113 related to the extracted parameters of the IT request from a policy database 112 that is configured to store policies for different scenarios and for different types of users. In one embodiment, some policies may be tailored for specific users, based on their subscriptions and prior habits. The policy may be with respect to at least one of: (i) the received request, and (ii) the determined risk associated with fulfilling the request.

For example, the conversation agent 103 determines whether an account of the user (which may be provided by the profile database 110) is authorized for the request. In one embodiment, it is also determined whether the request should be executed in view of the identified risk. For example, if the risk is above a predetermined threshold, then, the policy may be that the request is not fulfilled. Instead, execution of the request (in block 710) based on the policy may be sending a message to the user device of the user, to explain that the user is presently not authorized to perform this task. Alternatively, additional information may be requested from the user.

Accordingly, at block 710, the determined policy is executed. For example, there may be a policy that a password cannot be reset until a biometric verification is provided. Another policy may be to ask a series of questions to determine whether the user is who they purport to be. In one embodiment, each of the answers from the user may be received in natural language from the user 101(1) via their user device 102(1). Based on the policy, if the user is authorized and the risk is within a predetermined risk threshold, the request is fulfilled. In one embodiment, a time for executing the policy is measured. This time measurement may later be used as a parameter to calculate a level of trust of the user toward the conversation agent 103.

In one embodiment, at block 712, feedback is solicited from the user via their user device to determine whether the user is satisfied with the outcome. In some embodiments, feedback is solicited after a predetermined number of interactions (e.g., back and forth communication) with the user 101(1). For example, upon executing or fulfilling a request, the conversation agent may request feedback from the user device, asking the user to rank the execution or the fulfillment of the request on an appropriate scale, as discussed previously. In one embodiment, the ranking of the request is received by the conversation agent in natural language format. It should be noted that an execution of a request is not identical to a fulfillment of a request. For example, execution of a request means taking one or more steps based on the policy with respect to the request and the identified risk of the request. A fulfillment of a request means that the intent of the request is accommodated. Thus, an execution of a request may or may not fulfill the request.

At block 714, a trust is calculated between the user 101(1) and the conversation agent 103. In various embodiments, the trust may be calculated for at least one of: (i) a trust of the user toward the conversation agent, and (ii) a trust of the conversation agent toward the user. For example, the trust of the user toward the conversation agent can be determined from block 712 (where feedback is solicited from the user) and/or ascertained based one whether the request was successfully fulfilled and a time it took to execute the request. For example, if the request was successfully fulfilled, it is likely that the level of trust of the user 101(1) toward the conversation agent 103 would be high (e.g., 0.8). Further, if the request was executed (in this case fulfilled) within a predetermined time threshold and within a threshold number of iterations, then it is likely that this level of trust would be even higher (e.g., 0.9).

In some embodiments, additional indicia are used to determine the level of trust of the user 101(1) toward the conversation agent 103. For example, the tone of the user (e.g., elevated voice, use of derogatory terms, sighs, etc.,) collectively referred to herein as indicia of disposition of the user, is also used to determine the level of trust of the user 101(1) toward the conversation agent 103. Thus, even though the request from the user is fulfilled within a predetermined threshold time, if the disposition of the user is ranked to be low, the user 101(1) is deemed to have a low level of trust (e.g., 0.5) with respect to the conversation agent 103. Accordingly, various indicia may be aggregated to ascertain the level of trust, where some indicia are assigned higher weight than other indicia.

The trust of the conversation agent 103 toward the user 101(1) is calculated in a similar way. In one embodiment, the trust of the conversation agent 103 toward the user 101(1) is based on: (i) a level of risk associated with fulfilling the request; (ii) relevance of the request with respect to the resources of the private network 108; and/or (iii) whether a response is received from the user device within a threshold time of the question being asked. For example, the higher the risk of the request, the lower a level of trust between the conversation agent 103 and the user 101(1) may be. In another example, even if the user is authorized with respect to the request, if the request is deemed to be unusual based on the profile information of the user, the level of trust may be lower. These parameters and others may be used to identify a level of trust between the conversation agent toward the user 101(1).

In one embodiment, a previously stored level of trust of (i) the user 101(1) toward the conversation agent 103 and/or (ii) the conversation agent 103 toward the user 101(1) are retrieved from the profile database 110. The previously stored level of trust of the user 101(1) toward the conversation agent 103 may be calculated as a trust at time $T_t$, while the present level of trust $T_{t+1}$ is based on the present risk, present outcome, and trust at time $T_t$ (of the user 101(1) toward the conversation agent 103). Similarly, the previously stored level of trust of the conversation agent 103 toward the user 101(1) may be calculated as a trust at time $T_t$, while the present level of trust $T_{t+1}$ is based on the present risk, present outcome, present relevance, and a trust at time $T_{t+1}$ (of the conversation agent 103 toward the user 101(1)). In one embodiment, the new calculated level of trust (i.e., of the user 101(1) toward the conversation agent, and/or the conversation agent 103 toward the user 101(1)) is/are stored in the profile database 110 for future reference.

At block 716, a behavioral approach of the conversation agent 103 toward the user is adjusted based on at least one of: (i) the determined trust level of the user 101(1) toward the conversation agent 103, and (ii) the determined trust level of the conversation agent 103 toward the user 101(1). A user 101(1) can decide to take the following actions: (i) continue using the conversation agent; (ii) stop using the conversation agent; and (iii) escalate the request to an administrator of the private network 108. It will be understood that the higher level of trust of the user 101(1) toward the conversation agent 103, the higher the probability that they will continue using the conversation agent.

Upon determining that the level of trust of the user 101(1) toward the conversation agent 103 is below a predetermined threshold, the conversation agent 103 adjusts the behavioral approach of the interaction with the user 101(1) such that the user 101(1) continues using the conversation agent 103. For example, additional guidance may be provided to explain the reason for each question; incentives may be provided; etc.

A conversation agent 103, based on their trust toward the user 101(1), can perform the following actions: (i) fulfill the request; (ii) restrict access (e.g., privileges) to the private network 108, and (iii) block the request and/or raise an alert. Upon determining that the trust toward the user 101(1) is below a predetermined threshold level, the behavioral approach toward the user 101(1) is adjusted to exhibit additional caution.

For example, as indicated by block 718, one or more additional interactions with the user 101(1) may be performed (e.g., additional feedback may be solicited for security reasons and/or to clarify the request). In one embodiment, each of these interactions may be performed via natural language between both parties. If the level of trust of the conversation agent 103 toward the user 101(1) is below a predetermined threshold, the questions that are asked may be more complex or more intrusive (e.g., social security number, place of birth, request for biometric information, etc.,). Further, access may be restricted, additional security measures may be adaptively added. In contrast, as the level of trust toward the user 101(1) increases, the security measures are adaptively removed, additional risk is tolerated, and the interaction with the user 101(1) is simplified. For example, voice recognition with a lower confidence level may be enough to advance the IT request. Upon receiving a response in natural language from the user, the process continues with block 704. By virtue of the process 700 discussed herein, the resources of the chatbot server 120 are conserved, while customer satisfaction is improved.

Example Computer Platform

Figure 8:
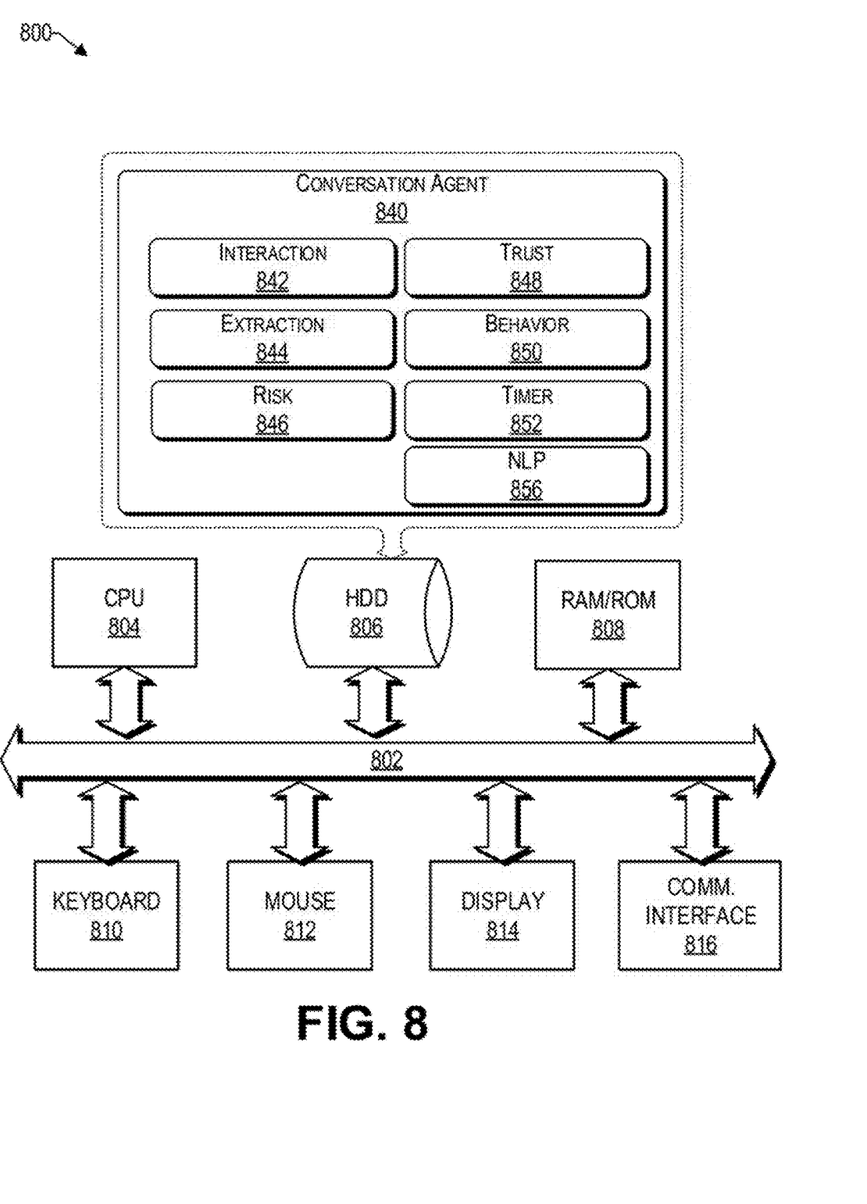
FIG. 8 provides a functional block diagram illustration of a computer hardware platform.

As discussed above, functions relating to processing IT requests that are in natural language, can be performed with the use of one or more computing devices connected for data communication via wireless or wired communication, as shown in FIG. 1 and in accordance with the process 700 of FIG. 7. An exemplary computing device in the form of a user device 200 has been discussed above with respect to FIG. 2. FIG. 8 provides a functional block diagram illustration of a computer hardware platform that is capable of processing natural language. In particular, FIG. 8 illustrates a network or host computer platform 800, as may be used to implement a server, such as the chatbot server 120 of FIG. 1.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the conversation agent 840, in a manner described herein. The conversation agent 840 may have various modules configured to perform different functions.

For example, there may be an interaction module 842 that is operative to receive an IT request in natural language from a user device and to provide questions to the operator of the user device.

In one embodiment, there is an extraction module 844 operative to extract parameters from the IT request that is provided in natural language. Concept expansion may be applied by the extraction module 844 to determine the intent of the request.

In one embodiment, there is a risk assessment module 846 operative to determine how fulfillment of the received request would impact a business enterprise. The risk assessment module 846 is also operative to determine a risk perceived by the user with respect to interacting with the conversation agent.

In one embodiment, there is a trust module 848 operative to determine: (i) a level of trust of a user toward the conversation agent, and (ii) a level of trust of the conversation agent toward the user.

In one embodiment, there is a behavior module 850 operative to adjust a pattern of interacting (e.g., questioning) a user based on at least one of: (i) an identified level of trust of the user toward the conversation agent, and (ii) an identified level of trust of the conversation agent toward the user.

In one embodiment, there is a timer module 852 operative to calculate various parameters. For example, a length of time from a received IT request in natural language to execution of the request and/or the fulfillment of the request can be calculated. Further, a length of time it takes a user to respond to an inquiry of the conversation agent can be calculated. The conversation agent 840 can then determine whether the measured time intervals exceed various time thresholds, which can be used as parameters of determining levels of trust between the parties.

In one embodiment, there is a natural processing module 856 operative to use one or more machine learning algorithms to better accommodate the human interacting with the machine.

In one embodiment, a program, such as Apache™, can be stored for operating the system as a Web server. In one embodiment, the HDD 806 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device coupled to the processor;
   a conversation agent software stored in the storage device, wherein an execution of the software by the processor configures the computing device to perform acts comprising:
   receiving an information technology (IT) electronic request in natural language from a user, via a user device, over the network;
   extracting parameters of the electronic request;
   determining a risk of the electronic request;
   determining a policy based on the parameters and the risk of the electronic request;
   executing the policy;
   calculating a level of trust between the user and the conversation agent based on the determined risk and an outcome of the execution of the policy; and
   adjusting a conversation pattern of the conversation agent toward the user based on the calculated level of trust.

2. The computing device of claim 1, wherein extracting parameters of the electronic request comprises:
   performing speech recognition to determine a textual representation of the electronic request;
   performing speech segmentation on the textual representation of the electronic request; and
   applying concept expansion on the textual representation of the electronic request to determine an intent of the electronic request.

3. The computing device of claim 1, wherein determining the risk of the electronic request comprises determining how fulfillment of the electronic request would affect one or more resources of an IT network of a business enterprise.

4. The computing device of claim 1, wherein determining the policy comprises determining whether the user is authorized to submit the electronic request.

5. The computing device of claim 1, wherein calculating the level of trust between the user and the conversation agent comprises calculating a level of trust of the conversation agent toward the user.

6. The computing device of claim 5, wherein calculating the level of trust of the conversation agent toward the user is further based on a relevance of the electronic request with respect to resources of a private network of the computing device.

7. The computing device of claim 1, wherein calculating a level of trust between the user and the conversation agent comprises calculating a level of trust of the user toward the conversation agent.

8. The computing device of claim 1:
wherein calculating the level of trust between the user and the conversation agent comprises:
calculating a first level of trust of the conversation agent toward the user; and
calculating a second level of trust of the user toward the conversation agent; and
wherein the adjustment of the behavioral approach of the conversation agent toward the user is based on the calculated first level of trust and the calculated second level of trust.

9. The computing device of claim 1, wherein execution of the conversation agent by the processor further configures the computing device to perform acts comprising:
soliciting a satisfaction feedback regarding the execution of the electronic request, from the user via the user device, wherein calculating a level of trust between the user and the conversation agent is further based on the satisfaction feedback.

10. The computing device of claim 1, wherein execution of the conversation agent by the processor further configures the computing device to perform acts comprising:
retrieving a prior level of trust between the user and the conversation agent, wherein calculating the level of trust between the user and the conversation agent is further based on the prior level of trust between the user and the conversation agent.

11. A non-transitory computer readable storage medium tangibly embodying a computer readable program code having computer readable instructions that, when executed, causes a computer device to carry out a method of processing an information technology (IT) electronic request, the method comprising:
receiving the electronic request in natural language from a user;
extracting parameters of the electronic request;
determining a risk of the electronic request;
determining a policy based on the parameters and the risk of the electronic request;
executing the policy;
calculating a level of trust between the user and the computer device based on the determined risk, and an outcome of the execution of the policy; and
adjusting a conversation pattern of the computer device toward the user based on the calculated level of trust.

12. The non-transitory computer readable storage medium of claim 11, wherein extracting parameters of the electronic request comprises:
performing speech recognition to determine a textual representation of the electronic request;
performing speech segmentation on the textual representation of the electronic request; and
applying concept expansion on the textual representation of the electronic request to determine an intent of the electronic request.

13. The non-transitory computer readable storage medium of claim 11, wherein determining the risk of the electronic request comprises determining how fulfillment of the electronic request would affect one or more resources of an IT network of a business enterprise.

14. The non-transitory computer readable storage medium of claim 11, wherein determining the policy comprises determining whether the user is authorized to submit the electronic request.

15. The non-transitory computer readable storage medium of claim 11, wherein calculating the level of trust between the user and the computer device comprises calculating a level of trust of the computer device toward the user.

16. The non-transitory computer readable storage medium of claim 15, wherein calculating the level of trust of the computer device toward the user is further based on a relevance of the electronic request with respect to resources of a private network of the computing device.

17. The non-transitory computer readable storage medium of claim 11, wherein calculating a level of trust between the user and the computer device comprises calculating a level of trust of the user toward the computer device.

18. The non-transitory computer readable storage medium of claim 11:
wherein calculating the level of trust between the user and the computer device comprises:
calculating a first level of trust of the computer device toward the user; and
calculating a second level of trust of the user toward the computer device; and
wherein the adjustment of the behavioral approach of the computer device toward the user is based on the calculated first level of trust and the calculated second level of trust.

19. The non-transitory computer readable storage medium of claim 11, wherein execution of the computer device by the processor further configures the computing device to perform acts comprising:
soliciting a satisfaction feedback regarding the execution of the electronic request, from the user via the user device, wherein calculating a level of trust between the user and the computer device is further based on the satisfaction feedback.

20. The non-transitory computer readable storage medium of claim 11, wherein execution of the computer device by the processor further configures the computing device to perform acts comprising:
retrieving a prior level of trust between the user and the computer device, wherein calculating the level of trust between the user and the computer device is further based on the prior level of trust between the user and the computer device.

* * * * *